United States Patent
Pollack et al.

(10) Patent No.: US 7,651,137 B2
(45) Date of Patent: Jan. 26, 2010

(54) INSULATED PIPE JOINT

(75) Inventors: Jack Pollack, Monaco (MC); David C. Riggs, Coppell, TX (US)

(73) Assignee: Single Buoy Moorings, Inc. (CH)

( * ) Notice: Subject to any disclaimer, the term of this patent is extended or adjusted under 35 U.S.C. 154(b) by 0 days.

(21) Appl. No.: 11/711,528

(22) Filed: Feb. 27, 2007

(65) Prior Publication Data
US 2007/0210577 A1 Sep. 13, 2007

Related U.S. Application Data

(60) Provisional application No. 60/780,189, filed on Mar. 8, 2006.

(51) Int. Cl.
*F16L 15/00* (2006.01)
*F16L 58/02* (2006.01)
*E21B 17/01* (2006.01)
*B23P 25/00* (2006.01)

(52) U.S. Cl. .................. 285/55; 285/294.1; 285/333; 166/367; 29/447; 29/458; 29/460; 29/527.2

(58) Field of Classification Search ............. 285/294.1, 285/294.2, 47, 55, 333, 334; 166/367
See application file for complete search history.

(56) References Cited

U.S. PATENT DOCUMENTS

| | | | | |
|---|---|---|---|---|
| 2,646,822 A * | 7/1953 | Ferguson | ...................... | 285/55 |
| 2,742,384 A * | 4/1956 | Burleson | ..................... | 138/109 |
| 2,857,931 A * | 10/1958 | Lawton | ....................... | 285/55 |
| 3,284,110 A * | 11/1966 | Marcus et al. | .............. | 285/235 |
| 3,286,343 A * | 11/1966 | Alfille et al. | ................... | 419/8 |
| 3,731,710 A * | 5/1973 | Bauer et al. | ................. | 138/143 |
| 4,304,616 A * | 12/1981 | Richardson | .................. | 156/86 |
| 4,380,347 A * | 4/1983 | Sable | ......................... | 285/45 |
| 4,853,165 A * | 8/1989 | Rosenzweig et al. | ........ | 264/450 |
| 5,131,688 A * | 7/1992 | Tricini | ......................... | 285/53 |
| 5,397,615 A * | 3/1995 | Van Beersel et al. | .......... | 428/57 |
| 5,722,701 A * | 3/1998 | Choi | .......................... | 285/337 |
| 6,065,781 A * | 5/2000 | Titus | ............................ | 285/55 |
| 6,355,318 B1 * | 3/2002 | Tailor et al. | ................ | 428/34.9 |
| 6,402,201 B1 * | 6/2002 | Pool et al. | ...................... | 285/47 |
| 2002/0163182 A1 * | 11/2002 | Kirkegaard | .................. | 285/47 |
| 2004/0178626 A1 * | 9/2004 | Segreto | ....................... | 285/47 |

FOREIGN PATENT DOCUMENTS

GB    2 388 169 A    11/2003
WO    WO 2004/035375 A1    4/2004

* cited by examiner

*Primary Examiner*—James M Hewitt
(74) *Attorney, Agent, or Firm*—Leon D. Rosen

(57) ABSTRACT

A pipeline (20) that lies primarily in the sea and that is formed of multiple steel pipe sections connected in tandem at pipe joints, includes a protective coating around the pipe sections and around the pipe joints. Each pipe section is first covered, at an onshore facility, by an initial coating (30, 32) that extends along at least 80% of the pipe section length while leaving its ends uncovered, to leave gripping areas (40, 42) where the steel of the pipe is uncovered so the pipe can be clamped by tools such as those with steel jaws to position and slide it axially, or turn it, or prevent it from turning. After a pair of pipe sections are connected, a completion coating (50) is applied around the pipe joint to leave the pipeline with a coating around all of it.

11 Claims, 3 Drawing Sheets

INSULATED PIPE JOINT

CROSS-REFERENCE

Applicant claims priority from U.S. provisional patent application 60/780,189 filed Mar. 8, 2006.

BACKGROUND OF THE INVENTION

Steel pipelines are widely used to carry hydrocarbons though the sea. Such a pipeline includes multiple steel pipe sections, each of a length such as 40 feet (12.2 meters) for pipe sections having a ten inch (0.254 m) diameter, with adjacent ends that are connected together. Many different techniques are used to connect adjacent ends together. One method is thermal expansion-shrinking where one pipe end is expanded with heat and the other one is shrunk with cold before interfitting them. Another is a braze coupling where brazing material (but not the pipe ends) is melted to join two pipe ends. Another is mechanical upsetting in which one pipe end is forcefully expanded to receive the other. Another is a castellated or ordinary thread coupling where a separate coupling with female threads threadably joins two male-threaded pipe ends. Another is forming concentric grooves on threads in pipe section ends that are axially forced together without screwing. Another is a direct threaded coupling where threaded male and female pipe ends are coupled by direct threading to each other. In most of these connecting methods, the pipe ends must be securely gripped, or clamped by tools that can move the pipe ends together and possibly turn one and prevent turning of the other.

Steel pipelines that lie in the sea and carry hydrocarbons are almost always coated with a protective coating. The coating protects the pipeline from corrosion caused by seawater. The coating is usually necessary also, to prevent excess cooling of hydrocarbons in the pipeline, which could result in the forming of wax or hydrates in the pipeline that could block it.

It is usually desirable to apply pipe section coatings on land, where the most reliable coatings can be applied, and at lowest cost. However, coatings applied to surfaces that must be gripped by tools such as jaws, will often be damaged by the tools. Also, the tools often will not achieve a good grip on the relatively soft surfaces of coatings as compared to the steel surface of the pipe itself. A method that allowed the connection of pipe sections in a manner that provided steel pipe grip surfaces for engagement by pipe-gripping tools, while requiring a minimum of coating operations during in-field offshore operations, would be of value.

SUMMARY OF THE INVENTION

In accordance with one embodiment of the invention, a method is provided for the preparation and installation of steel pipe sections into a long pipe string in a sea, which provides bare steel gripping surfaces on the ends of the pipe sections to facilitate handling them during their tandem connections, and while providing reliable coatings at minimal cost. Each pipe section is coated with an initial coating while the pipe section is located on land, with the initial coating extending along most of the pipe section length, except at the pipe ends. This leaves bare gripping surfaces at the pipe ends, that can be gripped by pipe handling equipment such as make-up tongs.

After a pair of pipe sections are connected at an installation vessel, and before the pipe joint is lowered into the sea, a completion coating is applied around the limited length of uncoated pipe at the joint where the pair of pipe ends are connected. The completion coating covers the gripping surfaces that were left when the initial coatings were applied and also usually extends over the ends of the initial coatings. The completion coatings are of limited lengths that are usually no more than twice the combined diameters of the two joined pipes, which is a small portion of a pipe section whose length is usually more than twenty times its pipe diameter.

The completion coating can include a shrink wrap in the form of a polymer band that is wrapped around a pipe joint, with the shrink wrap heated to shrink it tightly around the joint. A layer of insulation may be wrapped around the joint to provide good thermal insulation, before the shrink wrap is applied around the joint.

The novel features of the invention are set forth with particularity in the appended claims. The invention will be best understood from the following description when read in conjunction with the accompanying drawings.

BRIEF DESCRIPTION OF THE DRAWINGS

FIG. 5 is a partial sectional view of two joined pipes with a completion coating applied, where the pipe sections have enlarged ends.

DESCRIPTION OF THE PREFERRED EMBODIMENTS

Figure 1:
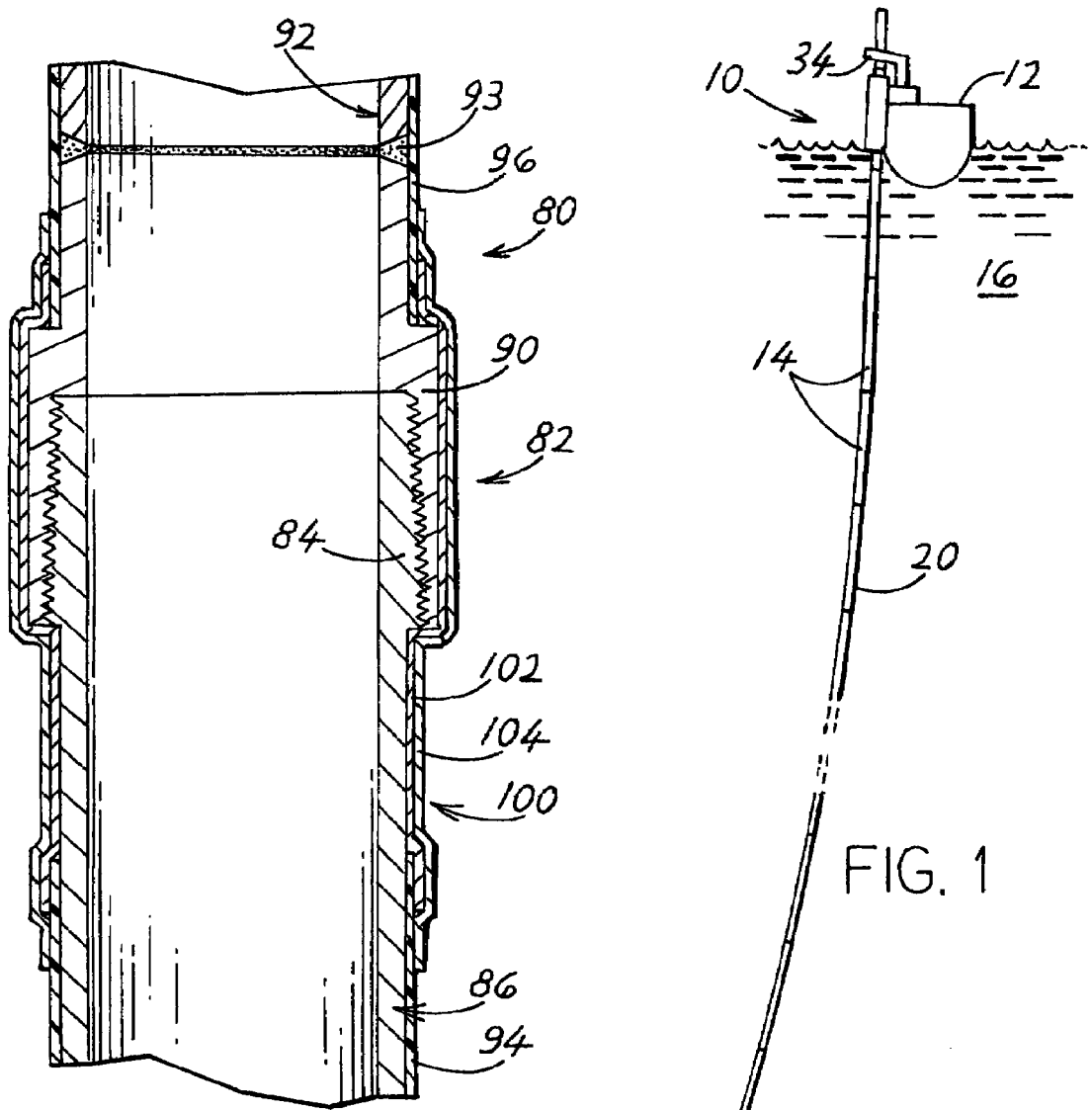
FIG. 1 is an elevation view of an installation vessel and of a steel pipeline being installed by the vessel into the sea.

FIG. 1 shows an installation system 10 which includes an installation structure in the form of a platform or vessel 12 that is in the process of connecting pipe sections 14 in tandem and lowering them into the sea 16. The pipeline 20 formed by the tandem-connected pipe sections is to be used to carry hydrocarbons, as to carry hydrocarbons from an undersea well to a production vessel that will replace the installation vessel, or from a tanker to a receiving terminal, or in other applications. The pipe sections are formed of steel pipe and have coverings, or coatings that are combined with cathode protection to avoid corrosion in sea water. In many cases, the coating is also useful as a thermal insulator to prevent cooling of hydrocarbons passing though the pipeline, so as to avoid the formation of wax and hydrates that could block the pipeline.

The pipeline usually includes much more than ten pipe sections connected in tandem. Each pipe section typically has a length of 40 feet (12.2 meters) for a 10 inch (0.254 m) pipe, and the pipe sections each has a weight of 1.5 to 2.0 tons. The connections can be made in a number of ways which are listed above. The next pipe to be connected to the last pipe that was lowered into or towards the sea, must be tightly gripped or clamped by a clamping tool to accurately align the two pipe sections and move them together. Probably the most common type of pipe joint is the simple threaded connection where a male threaded pipe end is threadably connected to a female threaded pipe end by turning one of them while holding the other one against turning, and while keeping the pipe sections accurately aligned. This requires that each pipe section be tightly gripped by the jaws of pipe manipulating machines. The pipe coatings are of material much softer than steel and often not intimately bonded with the steel surface of the pipe. The gripping tools that must move the pipes into accurate alignment and make other movements such as turning, cannot reliably grip the coatings and often damage the coatings while gripping them.

Figure 2:
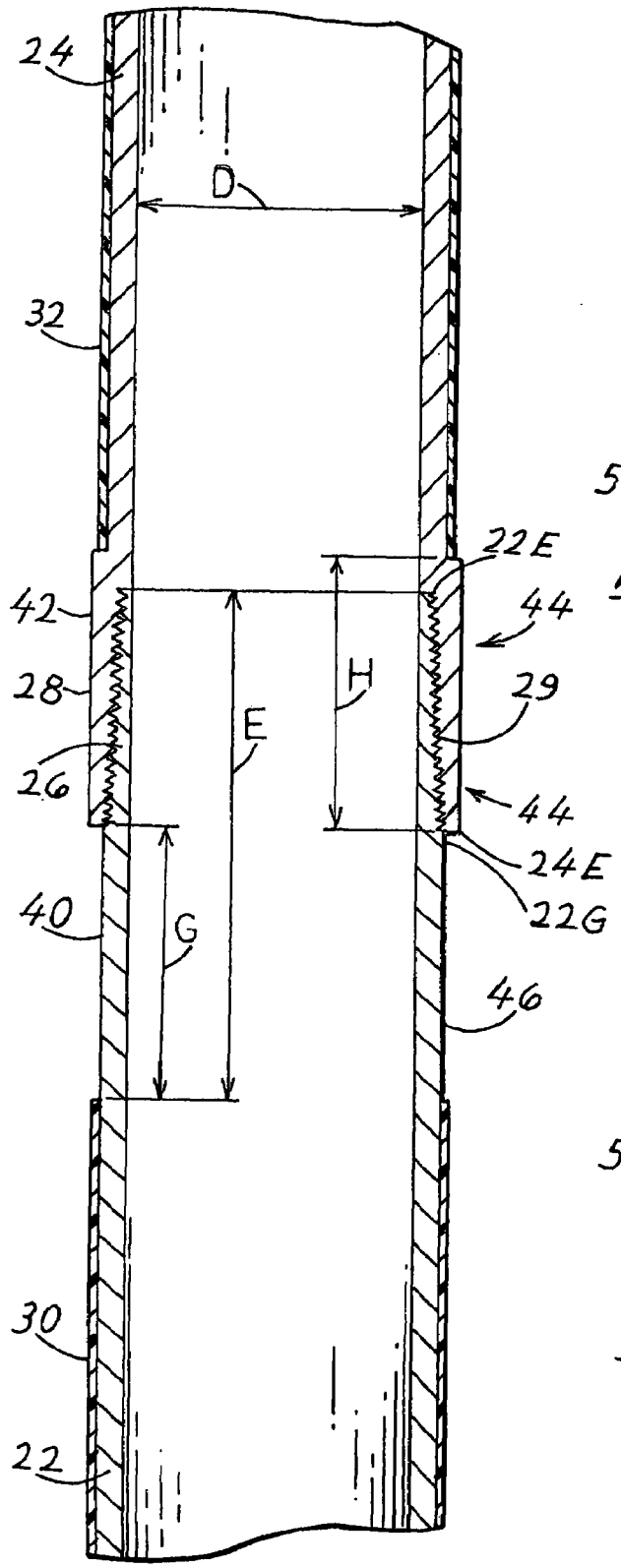
FIG. 2 is a partial sectional view of two pipe sections that are joined in a pipe joint, with each pipe section having an initial coating that leaves bare steel gripping surfaces at the end portion of the pipe section.

In accordance with the present invention, applicant initially coats each pipe section with a main coating that covers at least 80% and preferably at least 90% of the length of the pipe section. The ends of each pipe section are left bare, or uncoated. The pipe ends may contain a thermal sprayed aluminum or primer film (thickness less than 0.004 inch, or 0.1 mm) which is not considered a coating, so the pipe end is still bare. A coating or covering layer has a thickness of more than 0.1 mm, and usually more than 0.2 mm. FIG. 2 shows a pair of pipe sections 22, 24 having adjacent ends 26, 28 that have been joined by engagement of helical grooves, or threads 29 at their ends. The pipe sections 22, 24 are formed of steel. Initial coatings, or layers 30, 32 of materials with less than half the hardness of steel such as polymers, lie around most of the length of each pipe section, to protect the steel pipe against corrosion from sea water and to insulate the pipe to minimize heat loss. The drawings show that the initial coatings lie tightly around the pipe sections. Heat loss can result in cooling of hot oil to a temperature at which wax or hydrates form in the pipes, which can block the pipes. Previously, each pipe section would be constructed with a covering that covered the entire portion of the pipe that would be exposed after a connection, or joint. However, such a coating cannot be clamped tightly by pipe-handling equipment, without unacceptable damage to the coating. Such pipe-handling equipment have gripping tools (34, FIG. 1), which may have hardened steel jaws that hold a pipe section and that may move it axially and/or turn it (or prevent it from turning) during threadable or other assembly of a long string of pipe sections as they are lowered into the sea.

In the present invention, limited areas of the outer surfaces of the pipe section ends 26, 28 have been left bare to provide exposed steel gripping surfaces 40, 42. Each uncovered gripping surface extends a plurality of centimeters away from each pipe section end 22E, 24E, and usually at least 20 centimeters from the exposed pipe end 22G, 24E. After the pipe sections have been joined in a pipe joint 44, a corrosion-resistant completion coating that is usually also a thermal-insulating coating, is applied around the exposed joint surface 46 of the pipe joint, at the previously bare pipe end gripping surfaces 40, 42. This coating is applied "in the field" while the pipe sections are held in a primarily vertical orientation (or a primarily horizontal orientation in S-lay installation) and while they support the weight of a long length of pipe extending primarily downward into the sea. After the assembly and the application of the supplemental coating, the pipe sections are lowered from the floating structure and eventually into the sea, so axial tension is applied to the joints by reason of the weight of the already-installed pipe sections.

If the initial coating covers 90% of the length of each pipe section, then the completion coating covers no more than 5% of the length of each pipe section plus about 1% of the length to cover an end of each initial coating. Therefore, the completion coating usually covers no more than 6% of the pipe section length.

Figure 3:
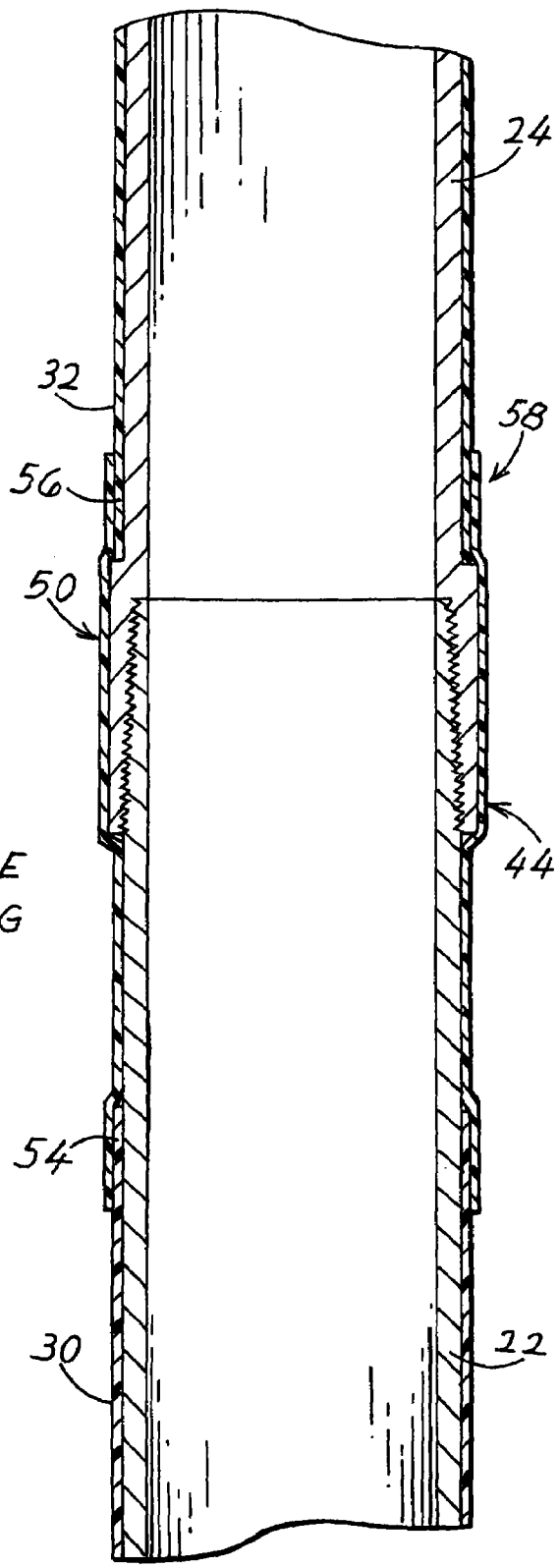
FIG. 3 is a partial sectional view of the two pipe sections of FIG. 2, with a completion coating lying around the pipe joint and around ends of the initial coatings

FIG. 3 shows one way to apply a supplemental, or completion coating 50 to the pipe joint 44, of suitable corrosion resistance and thermal insulation. A layer of wrap material, such as a sleeve of thermal shrink wrap or a band that will be wrapped by several turns, is placed around the exposed joint surface 46. Such shrink layer commonly has a thickness of one-sixteenth inch (0.063 inch or 1.6 mm). In the case of shrink wrap, the shrink wrap layer is heated to shrink it to lie tightly around the previously bare pipe gripping surfaces and usually also around the ends 54, 56 of the initial insulation layers 30, 32. However, it is possible to apply the completion coating so it only abuts the end of the initial coating, although this is usually not preferred. The shrink wrap can be in the form of one or more strips that are wrapped around the joint surface 46 and heated. A strip of shrink wrap, or a strip of very warm and sticky plastic can be wound around the joint surface 46 and then possibly heated and allowed to cool. A filler can lie under a thin sleeve for further thermal insulation. When the completion coating is applied, the joined pipe sections 22, 24 are covered by a covering 58 that extends continuously along the length of the pipe sections (with a possible thin gap if the completion coating does not overlap the initial coating).

Figure 4:
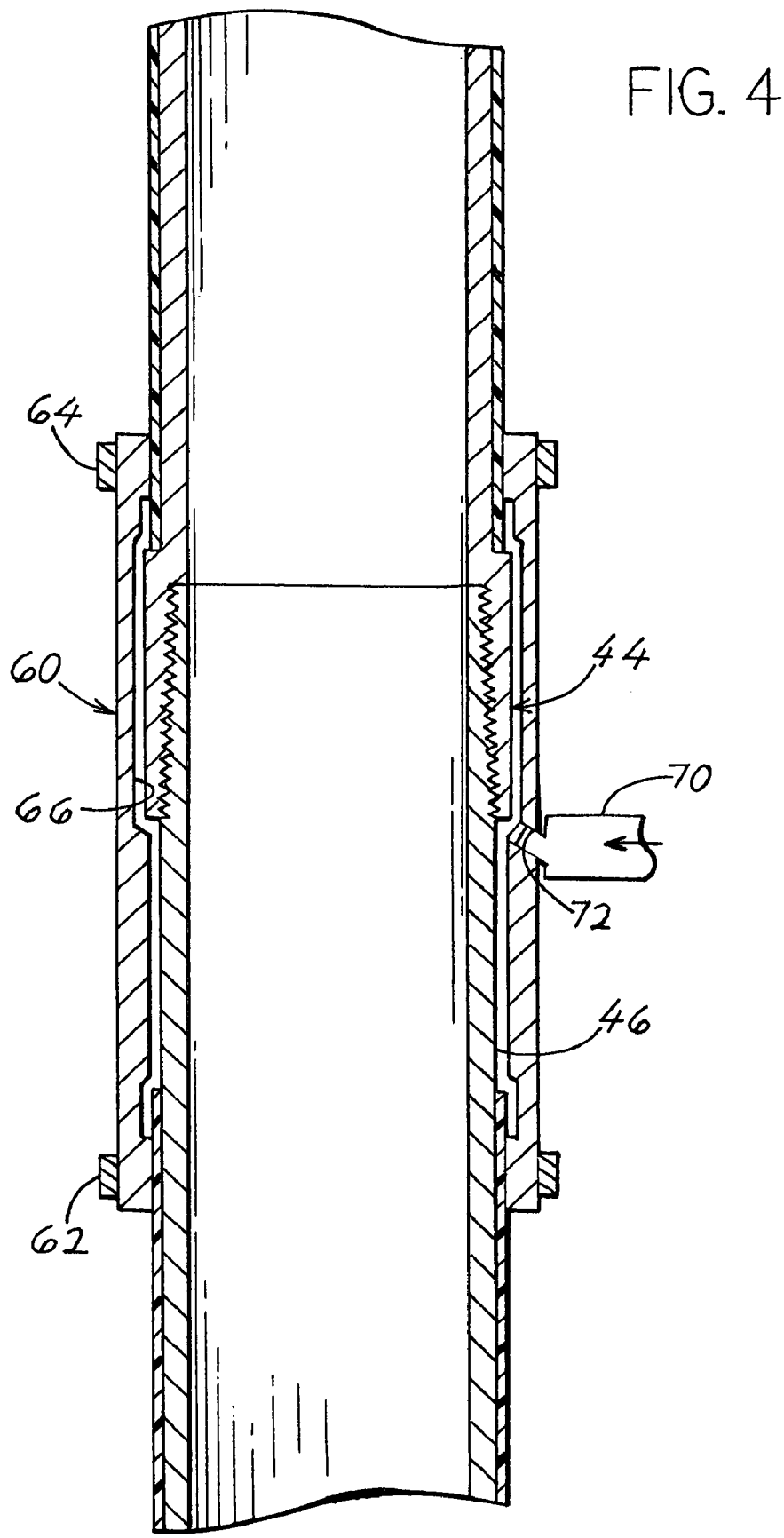
FIG. 4 is a partial sectional view of two joined pipe sections, showing a completion coating being applied by overmolding.

The pipe joint covering can be applied in a number of ways. A second way is to spray a thick coating of a fast-drying or curing insulation coating onto the joint surface 46. A third way, shown in FIG. 4, is to clamp a molding cover 60 around the joint surface 46, using a pair of clamps 62, 64, to form a mold cavity 66 with an annual space around the joint surface. A quick setting flowable insulating material is injected from a source 70 though an opening 72 in the cover to fill the cavity. When the injected material has solidified, the cover is removed. The injected material coating may have a thickness of 2 to 3 inches (5 to 8 cm).

Other methods are available to apply a completion coating over a pipe joint, in addition to the methods described above. The bare pipe joint surface can be covered with multiple wraps of shrink fitting or thermal setting material. These materials stick to themselves when applied and then bond to themselves. Shoulders that may be present in the pipe joint before the supplemental covering is applied, help to hold the completion coating in place. The wrap can be a hot extruded strip of syntactic polypropylene that is extruded from an extrusion head that moves around the pipe joint. The wrap can be a wound and cured rubber strip that is vulcanized into a solid filler with a split tool.

As mentioned above, there are many ways to join pipe ends together, including thermal shrink and expansion of pipe ends, brazing, mechanical upsetting and the use of a separate threaded coupling. However, the use of pipes with threaded ends that are simply screwed together is the most common way to make a pipe joint, because it is usually the cheapest way. FIG. 5 shows a pipe joint 80 that is of increased strength, but that also consists of two pipe ends that are directly threadably connected in a pipe joint 82. The male threaded end 84 of one pipe section 86 is manufactured with an increased diameter to avoid weakening arising from the threads, and the female end 90 of the other pipe section 92 is manufactured with an increased diameter to threadably receive the male end. The increased diameter of at least the female end is achieved by welding at 93 the female end to a pipe length. Both pipe sections have a thick initial coating 94, 96. The supplemental, or completion coating 100 includes an inner layer 102 of insulation and a securing layer 104 such as shrink wrap of material that contracts to hold tightly to the pipe joint.

As mentioned above, pipe sections with an inside diameter D (FIG. 2) of ten inches are usually produced in sections of lengths of 40 feet (12.2 meters). For a 40 feet length pipe section, the initial covering 30, 32 has a length of about 35 to 38 feet. The exposed male end 40 (lying beyond the initial coating 30) has a length E of no more than about three feet, but a gripping surface length G that must be covered by the completion covering, of a length of no more than a meter. The female end 28 has a gripping surface length H that must be covered, that is no more than two feet long. The entire joint surface G+H that must be covered has a length that is generally no more than three feet. This limited length greatly facilities the applying of an in-field covering about the pipe joint.

Thus, the invention provides a series of tandem-connected pipe sections with coverings for preventing corrosion and usually also for providing thermal insulation, which can be applied at moderate expense and that leave steel gripping surfaces at the pipe section ends during pipe section connection. Each steel pipe section is covered with an initial covering made on land, along at least 80% and preferably at least 90% of its length, with the initial coating providing the required corrosion and/or thermal insulation protection, while leaving uncovered gripping surfaces at the pipe ends. Jaws that grip the pipe sections grip directly to steel at the pipe section uncovered griping surfaces at the ends. After a pair of pipe ends are joined in a pipe joint, a completion coating is applied around the two joined pipe section ends, that is, around the pipe joint. The completion coating also extends around ends of the initial coatings. A number of different types of pipe joints are available to join two pipe section ends, and a number of different ways are available to apply a completion coating.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A primarily underwater pipeline comprising multiple steel pipe sections connected in tandem, which includes first and second steel pipe sections with adjacent front ends that have male and female pipe ends with mating grooves that are connected in a pipe joint wherein:
    said first steel pipe section has an extreme front end and has a first gripping surface extending rearward by a plurality of centimeters from a rear end of a groove of said male end, and said first steel pipe section has a first initial covering that lies tightly against an outer surface of said first steel pipe section and that extends from a location rearward of its gripping surface and along a majority of the length of the first steel pipe section;
    said second steel pipe section has an extreme front end and has a second gripping surface extending a plurality of centimeters rearward of its extreme front end, and has a second initial covering that lies tightly against an outer surface of said first steel pipe section and that extends from a location rearward of said second gripping surface and along a majority of the length of said second pipe section;
    a continuous completion covering extending around said pipe joint from a front portion of said first initial covering to a front portion of said second initial covering.

2. The underwater pipeline described in claim 1 wherein:
    said completion covering comprises a sleeve of shrink wrap polymer that overlaps said pipe joint including said front portions of said first and second initial coverings and that extends continually between said initial coverings and around said gripping surfaces.

3. The underwater pipeline described in claim 1 wherein:
    said completion covering extends tightly around end portions of said first and second initial coverings.

4. A method for connecting together adjacent first and second pipe section ends of first and second pipe sections to form a pipe joint, while the pipe sections are supported on an installation structure that lies in a sea, and to provide a covering around said pipe sections that extends continuously along the length of said first and second pipe sections including said pipe joint, during the installation of a string of multiple tandem-connected pipe sections in the sea, comprising:
    prior to connecting said ends of said pipe sections, covering each of said first and second pipe sections with an initial covering that extends along at least 80% but less than the entire length of the corresponding pipe section, while leaving an uncovered gripping surface extending a plurality of centimeters away from an extreme end of each of said first and second pipe sections;
    connecting said first and second pipe section ends to form said pipe joint, including engaging both pipe sections by gripping tools at their uncovered gripping surfaces;
    after connecting said pipe section ends to form said pipe joint, applying a completion covering around an exposed joint surface that includes said gripping surfaces of said pipe joint on said first and second pipe sections.

5. The method described in claim 4 wherein:
    said step of applying a completion covering includes applying a completion covering to said exposed joint surface and around ends of said initial covering.

6. The method described in claim 4, wherein:
    said step of applying a completion covering around said joint surfaces includes applying a shrink wrap layer around said joint surface and applying heat to said shrink wrap layer.

7. The method described in claim 6 wherein:
    said step of applying a completion covering around said joint surface includes wrapping a thermal insulation layer around at least said pipe joint before said step of applying shrink wrap layer around said joint surface.

8. The method described in claim 4 wherein:
    said step of applying a completion covering around said joint surface includes applying a mold cover around said joint surface to leave an annular space between the joint surface and the mold cover, including clamping opposite ends of the mold cover to said initial covering on each of said first and second pipes, and injecting a flowable polymer into said annular space.

9. The method described in claim 4 wherein:
    said initial covering has a thickness of at least 0.2 mm, and said uncovered gripping surface is devoid of a film of a thickness of more than 0.1 mm.

10. A method for connecting together adjacent first and second pipe section ends of first and second pipe sections to form a pipe joint, while the pipe sections are supported on an installation structure that lies in a sea, and to provide a covering around said pipe sections that extends continuously along the length of said first and second pipe sections including said pipe joint, during the installation of a string of multiple tandem-connected pipe sections in the sea, comprising:
    prior to connecting said ends of said pipe sections, covering each of said first and second pipe sections with an initial covering that extends along a majority of but less than the entire length of the corresponding pipe section, while leaving an uncovered gripping surface extending a plurality of centimeters away from an extreme end of each of said first and second pipe sections;
    connecting said first and second pipe section ends to form said pipe joint, including engaging both pipe sections by gripping tools at their uncovered gripping surfaces;
    after connecting said pipe section ends to form said pipe joint, applying a completion covering around an exposed joint surface that includes said gripping surfaces of said pipe joint on said first and second pipe sections.

11. The method described in claim 10 wherein:
    said step of applying a completion covering includes applying a completion covering to said exposed joint surface and around ends of said initial covering.

* * * * *